United States Patent [19]

Fetter

[11] 4,005,424
[45] Jan. 25, 1977

[54] SIMULATOR FOR DOPPLER RADAR RETURNS FROM PRECIPITATION

[75] Inventor: Richard W. Fetter, Warrenville, Ill.

[73] Assignee: The United States of America as represented by the Secretary of the Navy, Washington, D.C.

[22] Filed: Oct. 24, 1975

[21] Appl. No.: 625,392

[52] U.S. Cl. .............................. 343/17.7; 343/5 W; 35/10.4

[51] Int. Cl.² .......................................... G01S 7/40

[58] Field of Search ............ 343/5 W, 17.7; 35/10.4

[56] References Cited

UNITED STATES PATENTS

| | | |
|---|---|---|
| 3,077,039 | 2/1963 | Crawford et al. ................... 35/10.4 |
| 3,308,460 | 3/1967 | O'Brien ............................ 343/17.7 |
| 3,792,475 | 2/1974 | Smetana ........................... 343/17.7 |

Primary Examiner—T.H. Tubbesing
Attorney, Agent, or Firm—Richard S. Sciascia; George A. Montanye

[57] ABSTRACT

A waveform generator particularly suited for the simulation of Doppler radar returns from precipitation is provided. Also, waveform pattern selected capability is provided and spectral shapes such as Gaussian distributions, symmetrical and asymmetrical bimodal spectral shapes or flat spectra can be chosen and generated. The device is portable and capable of being used in the field.

9 Claims, 1 Drawing Figure

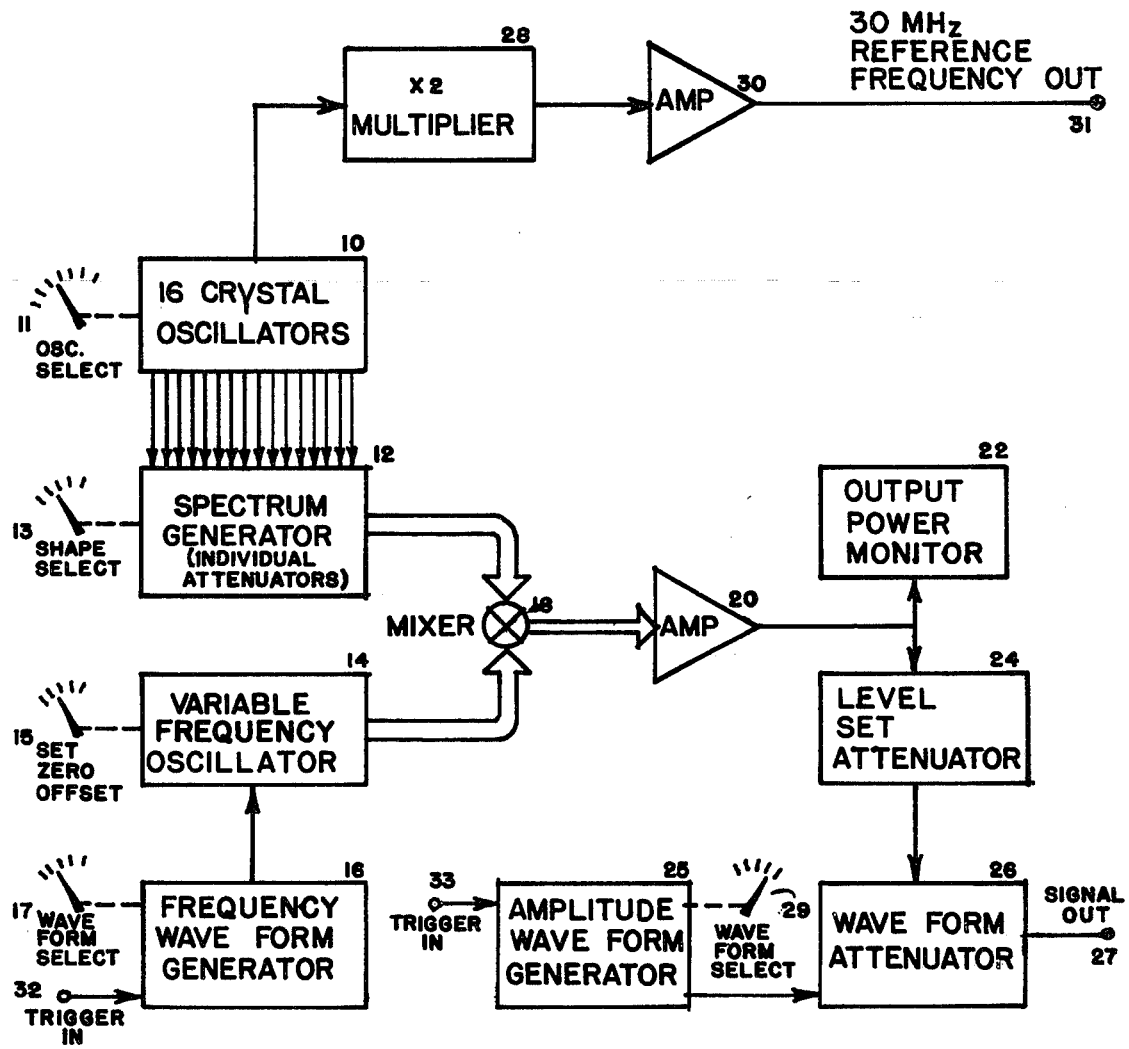

SIMULATOR FOR DOPPLER RADAR RETURNS FROM PRECIPITATION

The invention described herein may be manufactured and used by or for the Government of the United States of America for governmental purposes without the payment of any royalties thereon or therefor.

BACKGROUND OF THE INVENTION

This invention relates to the field of waveform generators and more particularly to a device and method capable of simulating radar returns from precipitation. The purpose of simulating such returns is so that a weather radar receiver and its associated circuitry can be accurately calibrated and tested. Moreover, the device presented herein may be employed to generate various dynamic weather patterns for training purposes.

It is desirable to test and calibrate weather radar systems to insure that the device accurately depicts and displays the ambient weather conditions. It is from such a display that a pilot is made aware of the general weather conditions surrounding his aircraft. Based upon his assessement of the displayed conditions, various judgments regarding air traffic routes are made. A variety of simulators are currently available for testing and calibrating such systems. These simulators include both digital and analogue devices. Some are capable of providing various Doppler returns (U.S. Pat. No. 3,745,579) while other simulators provide returns from the operation of a plurality of radar transmitters (U.S. Pat. No. 3,792,475). Moreover, there are sophisticated simulators such as that disclosed by Goetz (U.S. Pat. No. 3,832,712) which are capable of providing general Doppler returns. The major drawback to these devices, as typified by Goetz, is that they require the use of expensive high speed digital computers.

Previously, methods of generating precipitation return signals have been limited and have generally employed the statistical properties of random noise to simulate the random nature of the precipitation returns from the many scatterers. The random noise was used to modulate an audio frequency signal, which signal represented the frequency shift due to precipitation particle velocity. The shifted signal was then used to modulate an intermediate frequency signal and the intermediate frequency signal was applied to the radar under test. Such a system does not accurately depict precipitation, is difficult to tune, requires a variety of test instruments, and is not suitable for nor does it retain its calibration.

With the above disadvantages in mind, I have invented a method for simulating precipitation as well as a method of generating frequency spectra.

SUMMARY OF THE INVENTION

A plurality of individual crystal oscillators each having a frequency which is incremently spaced from the others by small random amounts are combined in a group to form a frequency spectrum. To accomplish this, the output of each oscillator is applied to an individual attenuator. The outputs of the attenuators are combined and the relative amplitudes determine the resulting shape of the frequency spectrum. A selected spectrum, the shape of which is determined by the attenuators, is then provided to a frequency mixer where the signals are mixed with a variable frequency oscillator (VFO). By varying the frequency of the VFO, the position of the frequency spectrum at the output of the mixer can be changed without altering the basic spectrum shape. This feature permits the simulation of precipitation velocity as represented by a Doppler frequency shift. A frequency waveform is provided to the VFO for the simulation of dynamic weather patterns. The output of the mixer is then amplified and applied to a level set attenuator. The output of the level set attenuator is applied to a waveform attenuator for the purpose of providing variable signal characteristic of dynamic weather patterns; that is to say a signal whose amplitude varies in range and time to simulate the characteristics of storm intensity.

OBJECTS

Accordingly, it is a primary object of this present invention to provide a method of simulating a signal representative of the return of a Doppler radar due to precipitation.

Another object of this present invention is to provide a simply constructed device capable of generating a variety of selectable frequency spectra, the shape of which can be controlled at will.

A further object of this present invention is to provide such a device in a small portable single package for bench and field operation.

Another object of this invention is to provide a simulator having improved accuracy which being less difficult to calibrate.

Other objects, advantages and novel features of the invention will become apparent from the following detailed description of the invention when considered in conjunction with the accompanying drawing wherein:

The FIGURE depicts a block diagram of the device capable of providing a simulation of a Doppler return from precipitation.

DESCRIPTION OF OPERATION

Most operative radar systems have an operating intermediate frequency of 30 megaHertz. Accordingly, for the purposes of this discussion, it is assumed that the radar to be calibrated or tested has such an intermediate frequency. However, some radar systems operate with a frequency different than 30 megaHertz and one skilled in the art will be able to adapt the teachings provided herein to radars having an intermediate frequency different than 30 megaHertz.

The FIGURE is a block diagram of a system capable of simulating precipitation returns. The device may be self-contained and is capable of providing a reference frequency output 31, signal output 27, and has an input trigger 32. Furthermore, the system has five selection switches to change the various operating parameters.

As shown in the FIGURE, 16 crystal oscillators 10 provide signals to spectrum generator 12. Each oscillator is connected to the spectrum generator 12 by an individual line. The frequency of the oscillator is selected to provide frequencies at a random spacing within a bandwidth of one kiloHertz at approximately 15 megaHertz. Although there are a variety of schemes that may be employed, the following scheme has been selected as an example of the individual frequencies (in MHz) of the sixteen oscillators:

TABLE 1

| Crystal No. | FREQUENCY |
|---|---|
| 1 | 14.999500 |
| 2 | 14.999570 |
| 3 | 14.999598 |
| 4 | 14.999670 |
| 5 | 14.999724 |
| 6 | 14.999781 |
| 7 | 14.999889 |
| 8 | 15.000000 |
| 9 | 15.000047 |
| 10 | 15.000108 |
| 11 | 15.000181 |
| 12 | 15.000263 |
| 13 | 15.000290 |
| 14 | 15.000357 |
| 15 | 15.000420 |
| 16 | 15.000503 |

Each oscillator is controlled by the oscillator selection switch 11. The switch is constructed such that each oscillator is represented at a particular position so that its frequency and power can be measured and calibrated as required by power monitor 22. A seventeenth position of the switch provides that all oscillators be energized at once and an eighteenth position of the switch is for the purpose of turning off all oscillators. The oscillators themselves are of the crystal controlled type and may be one of the many commerical types available from those companies well known in the trade. The individual output of each oscillator is represented as a line in the frequency domain and when all of the individual outputs are combined, the result constitutes the frequency spectrum having sufficient power to be manipulated by spectrum generator 12. The spectrum generator 12 is coupled to the crystal oscillators by individual lines or wires and consists of either a plurality of attenuators wherein each attenuator is capable of attenuating one of the oscillator outputs or a preset selected group of attenuators to produce a particular spectrum having a selected shape. For example, if one chooses to select a Gaussian distribution, a set of attenuators selected by switching shape selection switch 13 could provide this desired shape. This is accomplished with the frequencies chosen at random as in Table 1. The frequencies listed in Table 2 are in MHz and the amplitude in Volts:

TABLE 2

| NO | CRYSTAL FREQUENCY | AMPLITUDE |
|---|---|---|
| 1 | 14.999500 | .010 |
| 2 | 14.999570 | .032 |
| 3 | 14.999598 | .049 |
| 4 | 14.999670 | .115 |
| 5 | 14.999724 | .188 |
| 6 | 14.999781 | .294 |
| 7 | 14.999889 | .525 |
| 8 | 15.000000 | .632 |
| 9 | 15.000047 | .612 |
| 10 | 15.000108 | .520 |
| 11 | 15.000181 | .373 |
| 12 | 15.000263 | .210 |
| 13 | 15.000290 | .164 |
| 14 | 15.000357 | .083 |
| 15 | 15.000420 | .037 |
| 16 | 15.000503 | .010 |

Other various selected attenuator patterns could include symmetrical and asymmetrical bimodal shapes or flat spectra. The design of any spectrum depends upon the circumstances under which one intends to use the device and the multitude of various shapes is beyond the scope of this invention. However, it should be kept in mind that no matter what particular attenuator selection is made, each desired spectrum shape must be adjusted to have a mean frequency of 15 megaHertz for further processing.

The individual frequency signals on the various lines from the crystal oscillators, having been attenuated by a selected attenuator, are combined to produce the complete spectrum as an output of spectrum generator 12 and is then applied to mixer 18. This spectrum is mixed with the output of the variable frequency oscillator 14. The variable frequency oscillator 14 has a center freqeuncy of 45 megaHertz. The difference frequency output of mixer 18 is 30 megaHertz and is provided to amplifier 20 for amplification.

The purpose of the variable frequency oscillator 14 is to provide a mechanism for frequency shifting the spectrum. That is to say, the center frequency of any given spectrum is indicative of the Doppler velocity of the precipitation return. For example at a frequency of 45 megaHertz the spectrum is centered and this corresponds to zero velocity. However, if the variable frequency oscillator 18 provides a frequency shift upward by 100 Hertz the mean frequency of the mixer output will still be a frequency spectrum but will be shifted down by the 100 Hertz. This shift represents 50 wavelengths per second away from the receiver which corresponds to a positive velocity. The frequency of the variable frequency oscillator is controlled by selection switch 15. This switch may have a variety of positions; the ultimate choice of selected frequencies depends upon the operator's requirements. A first detent at 45 MHz represents a zero velocity, a second detent may add to 45 MHz to increase the velocity and a third detent may substract from 45 MHz to decrease the velocity. For example, the frequency of the first position would be 45 MHz + 0 Hz, the second position of the switch 15 may be 45 MHz − 50 Hz to represent a positive velocity, and the third position would be 45 MHz + 50 Hz to represent a negative velocity.

The velocity of the precipitation signal is derived thru the position of the frequency spectrum hence the further spectrum is away from the zero reference point the greater the velocity. (That is to say the further the frequency is from the 45 MHz VFO frequency, the higher the velocity). Also, it should be pointed out that the selected shape of the frequency operation is representative of the meteorological conditions to be simulated.

Frequency waveform generator 16 provides a signal to VFO 14 and is controlled by waveform selection switch 17. The purpose of the generator is to simulate the changing meteorological conditions present in a storm. During a storm the velocity of precipitation does not stay constant. As a matter of fact, a wide degree of velocity changes occur within relatively short ranges and short periods of time during intense storms. Accordingly, to simulate these dynamic conditons, the frequency waveform generator 16 changes the frequency of the VFO 14 to simulate velocity changes. As an example of the use of the waveform generator 16, it has been recognized that one waveform useful for the study of turbulence includes a constant amplitude sine wave of uniformly increasing frequency during the period between successive radar pulses. Accordingly, input trigger 32 starts the generation of such a waveform with the appropriate selection of waveform selection switch 17 and repeats at every successive pulse. By applying the selected waveform to variable frequency oscillator 14 an output, varying in frequency, is provided to mixer 18 with the signal required to simulate turbulence generated by waveform generator 16. The waveform generator 16 and its associated waveform selection switch are optional. That is to say such a feature can be used only when it is desirable to simulate various conditions such as snow, turbulence, hail and tornadoes. If the waveform selection switch 17 is in its off position, the device does not simulate dynamically changing meteorological conditions and the VFO 14 maintains a selected frequency.

The output of amplifier 20 is provided to output power monitor 22 and level set attenuator 24. The output power monitor 22 is capable of indicating the power from the frequency spectrum or the output of any single crystal oscillator. The purpose of the monitor 22 is for the assurance of proper calibration of either the individual crystal oscillator or the measurement of the frequency spectrum depending upon the position of oscillator selector switch 11.

Level set attenuator 24 is provided to attenuate the signal so that its amplitude properly interfaces with the radar system under test. Depending upon the input requirements of the system to be calibrated, the level set attenuator is adjusted to provide an amplitude output consistent with those requirements.

After the spectrum has been adjusted to conform to the input requirements of the radar to be tested, it is further processed through waveform attentuator 26. Waveform attenuator 26 variably attenuates the signal from attenuator 24 in accordance with the signal developed by amplitude wave generator 25. The purpose for changing the amplitude of the spectrum in a preset manner is to simulate the variation of intensity during a storm. Amplitude waveform generator 25 has a variety of preprogrammed repetitive waveforms that can be selected by selection switch 29. The waveform starts at the reception of the trigger from the input at 33 and repeats in an identical manner at each successive trigger pulse. The selection of a particular waveform depends upon the intensity pattern to be simulated. The waveform generated by 25 then is applied to the waveform attenuator 26 which alters the amplitude of the spectrum to effect the intensity simulation output at 27.

The waveform attenuator is an optional feature of this device and should only be switched on when one desires to simulate the intensity variations of a dynamic meteorological condition.

Finally, for reference purposes, a frequency multiplier 28 is connected to the crystal oscillator having the mean frequency of 15 MHz. This signal is then amplified by amplifier 30 to provide a 30 megaHertz frequency output at 31. This frequency is made available for the purpose of providing an accurate calibration reference signal for the many types of Doppler radar data processing circuitry currently in use.

Obviously many modifications and variation of the present invention are possible in light of the above teachings. It is therefore to be understood that within the scope of the appended claims the invention may be practiced otherwise than as specifically described.

I claim:
1. A device for simulating Doppler radar returns comprising:
    a. means for generating a plurality of signals, each being of an individual frequency and each having an individual amplitude, said plurality of signals having a selected mean frequency;
    b. means coupled to said means for generating a plurality of signals for selectively attenuating either any one of said plurality of signals or all of such signals and for summing said plurality of signals to provide a desired frequency spectrum signal;
    c. variable frequency oscillator (VFO) means for generating a VFO signal whose frequency can be controllably varied;
    d. signal mixing means for mixing said VFO signal with said frequency spectrum signal to provide a sum or difference frequency output signal.

2. The device as claimed in claim 1 further comprising:
    frequency waveform generator means coupled to said variable frequency oscillator means for controllably varying the frequency of the VFO signal in a repetative manner when pulsed by a trigger.

3. The device as claimed in claim 1 further comprising frequency multiplier means for multiplying and selected mean frequency, said multiplier means being coupled to said means for generating a plurality of signals, said output power monitoring means coupled to said signal mixing means for measuring the power of the frequency spectrum signal.

4. The device as claimed in claim 1 further comprising:
    level set attenuator means coupled to said signal mixing means for controllably setting the amplitude of the sum or difference frequency output signal.

5. The device as claimed in claim 4 further comprising:
    waveform attenuator means coupled to said level set attenuator means for controllably varying the amplitude of the output signal.

6. The device as claimed in claim 5 further comprising:
    amplitude waveform generator means coupled to said waveform attenuator means for automatically varying the amplitude of the output signal in a repetitive manner when pulsed by a trigger.

7. The device as claimed in claim 1 wherein means for generating a plurality of signals includes 16 crystal oscillators generating frequencies at a random spacing within a bandwidth of 1 KHz and having a selected mean frequency of approximately 15 MHz 8. The device as claimed in claim 1 wherein the individual attenuator means are a set of attenuators to provide a Gaussian-shaped frequency spectrum.

9. The device as claimed in claim 7 wherein the variable frequency oscillator means is a crystal oscillator having a center frequency of 45 MHz.

* * * * *